(12) United States Patent
Gong et al.

(10) Patent No.: US 12,345,467 B2
(45) Date of Patent: Jul. 1, 2025

(54) PARTIAL-FREEZING MEAT FRESH-PRESERVATION CONTROL METHOD, CONTROLLER, AND REFRIGERATOR

(71) Applicants: HEFEI HUALING CO., LTD., Anhui (CN); HEFEI MIDEA REFRIGERATOR CO., LTD., Anhui (CN); MIDEA GROUP CO., LTD., Guangdong (CN)

(72) Inventors: Qinqin Gong, Anhui (CN); Huixin Shi, Anhui (CN); Zhigang Wu, Anhui (CN); Zhifang Ning, Anhui (CN)

(73) Assignees: HEFEI HUALING CO., LTD., Hefei (CN); HEFEI MIDEA REFRIGERATOR CO., LTD., Hefei (CN); MIDEA GROUP CO., LTD, Foshan (CN)

( * ) Notice: Subject to any disclaimer, the term of this patent is extended or adjusted under 35 U.S.C. 154(b) by 879 days.

(21) Appl. No.: 16/612,252

(22) PCT Filed: Jun. 30, 2017

(86) PCT No.: PCT/CN2017/091137
§ 371 (c)(1),
(2) Date: Nov. 8, 2019

(87) PCT Pub. No.: WO2018/205386
PCT Pub. Date: Nov. 15, 2018

(65) Prior Publication Data
US 2021/0156610 A1    May 27, 2021

(30) Foreign Application Priority Data
May 9, 2017   (CN) .......................... 201710322733.0

(51) Int. Cl.
*F25D 29/00* (2006.01)
*A23B 2/00* (2025.01)
(Continued)

(52) U.S. Cl.
CPC .............. *F25D 29/00* (2013.01); *A23B 2/001* (2025.01); *A23B 2/805* (2025.01); *A23B 2/82* (2025.01);
(Continued)

(58) Field of Classification Search
CPC ......... F25D 29/00; A23B 2/001; A23B 2/805; A23B 2/82; A23B 4/066; A23B 4/07; G05B 15/02
(Continued)

(56) References Cited

U.S. PATENT DOCUMENTS 8,061,150 B2 * 11/2011 Kim ........................ F25C 1/18
62/449
8,397,521 B2   3/2013 Kim et al.
(Continued)

FOREIGN PATENT DOCUMENTS

CN    101358798 A    2/2009
CN    102706069 A    10/2012
(Continued)

OTHER PUBLICATIONS

JP 4948562 (Year: 2023).*
(Continued)

Primary Examiner — Steven W Crabb
Assistant Examiner — Alba T Rosario-Aponte
(74) Attorney, Agent, or Firm — K&L Gates LLP

(57) ABSTRACT

A partial-freezing meat fresh-preservation control method, a controller and a refrigerator are provided. The control method includes: S1 (101), acquiring a current temperature of meat food in a compartment of a refrigerator in real time;
(Continued)

S2 (102), judging whether the current temperature of the meat food is greater than or equal to a first temperature threshold $t_0$, and if yes, performing S3 (103); S3 (103), controlling the compartment to perform a cooling operation; S4 (104), judging whether the meat food is frozen during the cooling operation, and if yes, performing S5 (105), S5 (105), starting timing once the freezing occurs, and performing S6 (106) after the timing reaches a first preset time period; S6 (106), controlling the compartment to perform a heating operation; wherein, after the performance of the step S6 (106) is completed, the performance of the step S1 (101) is continued. The partial-freezing fresh-preservation control method provided by the embodiment of the present disclosure can maintain the meat food in a fresh and easy-to-cut state for a long time, and make up for the technical gap in the field.

12 Claims, 11 Drawing Sheets

(51) Int. Cl.
  *A23B 2/80*      (2025.01)
  *A23B 2/82*      (2025.01)
  *A23B 4/06*      (2006.01)
  *A23B 4/07*      (2006.01)
  *G05B 15/02*     (2006.01)

(52) U.S. Cl.
  CPC ............... *A23B 4/066* (2013.01); *A23B 4/07* (2013.01); *G05B 15/02* (2013.01); *F25D 2600/02* (2013.01); *F25D 2600/06* (2013.01); *F25D 2700/16* (2013.01)

(58) Field of Classification Search
  USPC ............................................. 99/483
  See application file for complete search history.

(56) References Cited

U.S. PATENT DOCUMENTS

| | | |
|---|---|---|
| 8,677,770 B2 | 3/2014 | Kim et al. |
| 10,772,454 B2* | 9/2020 | Mendonça Vilela Pinto Ferreira ................ A47J 36/321 |
| 2010/0083687 A1 | 4/2010 | Handa et al. |
| 2015/0323237 A1* | 11/2015 | Kim .......................... F25C 1/00 62/340 |
| 2021/0156610 A1 | 5/2021 | Gong et al. |
| 2021/0164727 A1 | 6/2021 | Gong et al. |

FOREIGN PATENT DOCUMENTS

| | | |
|---|---|---|
| CN | 103175375 A | 6/2013 |
| CN | 203163416 U | 8/2013 |
| CN | 104729190 A | 6/2015 |
| CN | 106461304 A | 2/2017 |
| EP | 1221577 | * 10/2002 |
| JP | 4-43276 A | 2/1992 |
| JP | 2001-4260 A | 1/2001 |
| JP | 2006-234365 A | 9/2006 |
| JP | 2007-113818 A | 5/2007 |
| JP | 2007271152 A | 10/2007 |
| JP | 2009-30934 A | 2/2009 |
| JP | 2010-261677 A | 11/2010 |
| JP | 4948562 B2 | 6/2012 |
| WO | 2009035194 A2 | 3/2009 |

OTHER PUBLICATIONS

CN 104729190 (Year: 2023).*
CN 103175375 (Year: 2023).*
CN 101358798 (Year: 2023).*
Cia Qing-wen et al , Advances in Fresh-keeping Techniques by Microfreezing, Food and Machinery, vol. 29, No. 6 (Year: 2023).*
Sun Kaizing et al Effect of Frozen Fresh-keeping on beef storage Quality, Food and Fermentation Technology, vol. 51, No. 6 (Year: 2023).*
JP2009030934 (Year: 2023).*
JP2001001260 (Year: 2023).*
CN104833169 (Year: 2023).*
Kaale et al , Superchilling of Foods, Journal of food Engineering, Barking Essex, GB, vol. 107, No. 2, Jun. 2, 2011, pp. 141-146 (Year: 2011).*
EP1221577 (Year: 2024).*
Kaale et al., "Superchilling of Food: A review," Journal of Food Engineering 107 (2011):141-146, 2011.

* cited by examiner

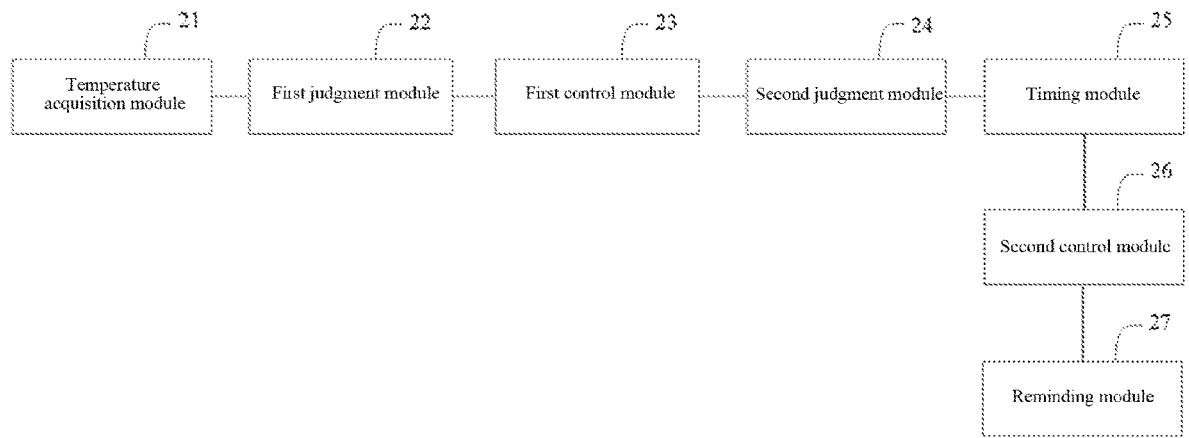
Fig. 12
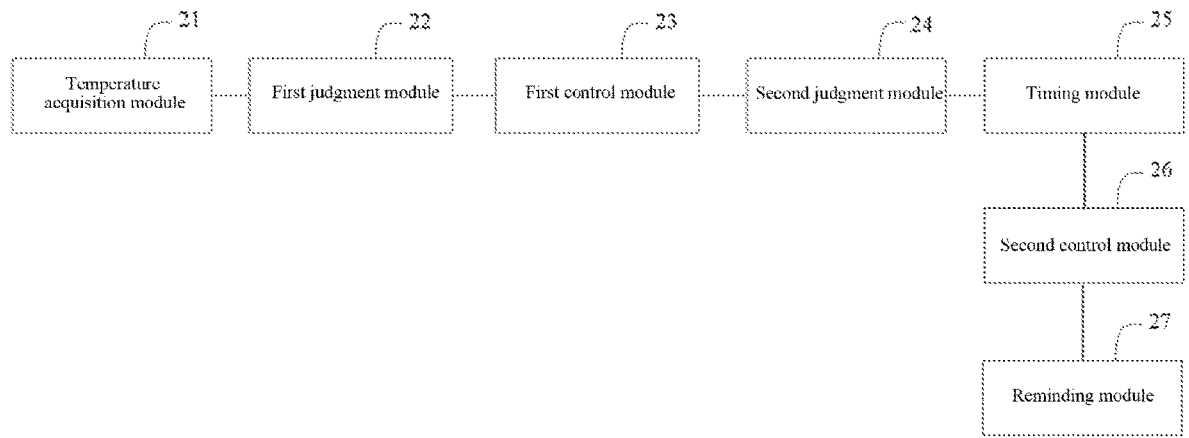

PARTIAL-FREEZING MEAT FRESH-PRESERVATION CONTROL METHOD, CONTROLLER, AND REFRIGERATOR

CROSS-REFERENCE TO RELATED APPLICATION

The present application claims priority to Chinese patent application No. 2017103227330 filed on May 9, 2017, entitled "Partial-freezing Meat Fresh-preservation Control Method, Controller and Refrigerator", which is incorporated herein by reference in its entirety.

BACKGROUND

Technical Field

This disclosure relates to the field of intelligent control, and in particular to a partial-freezing meat fresh-preservation control method, a controller and a refrigerator.

Description of the Related Art

With the popularity of refrigerators, people are getting more and more used to keeping food fresh and storing it using the refrigerators in order to prolong the fresh-preservation and storage period of food, especially for meat food.

Currently, the fresh-preservation control methods for meat mainly include the following:
(1) directly placing meat into a freezing compartment, freezing at −18° C. for storing in which the meat generally can be stored for several months, but one of the most serious problems is that it is inconvenient to be thawed, and the quality and taste of the thawed meat are significantly reduced;
(2) storing by soft freezing in which the temperature of the compartment is generally between −5° C. to −9° C. at this time, and there is a problem that the meat is still frozen and it is difficult to be thawed although the meat also can be stored for a longer period under this condition; and
(3) a zero-degree fresh-preservation technology or partial-freezing fresh-preservation technology being available in the market in which the temperature is controlled at about 2-3° C., but both are single temperature control scheme, and thus the fresh-preservation period is too short if the temperature is too high, and there is a risk of being hard due to be frozen if the temperature is too low.

It can be seen that there is currently no control technology that keeps the meat food fresh and easy to cut for a long time.

BRIEF SUMMARY

In view of the defects in the prior art, the present disclosure provides a partial-freezing meat fresh-preservation control method, a controller and a refrigerator. The partial-freezing meat fresh-preservation control method, the controller and the refrigerator provided by the present disclosure can keep the meat food fresh and easy to cut for a long time and solves the defects in the prior art that the fresh-preservation period is too short if the temperature is too high, or there is a risk of being hard due to be frozen if the temperature is too low, thereby making up for technical gap in this field.

In order to solve the technical problems above, the present disclosure provides the following technical solutions:

according to a first aspect, the present disclosure provides a partial-freezing meat cold preservation control method comprising:
S1, acquiring a current temperature of meat food in a compartment of a refrigerator in real time;
S2, judging whether the current temperature of the meat food is greater than or equal to a first temperature threshold $t_0$, and if yes, performing S3; wherein the first temperature threshold is a temperature value that keeps the meat food in a partial-freezing and easy-to-cut state;
S3, controlling the compartment to perform a cooling operation;
S4, judging whether the meat food is frozen during the cooling operation, and if yes, performing S5,
S5, starting timing once the freezing occurs, and performing S6 after the timing reaches a first preset time period;
S6, controlling the compartment to perform a heating operation;
wherein after the performance of the S6 is completed, the performance of the S1 is continued.

Further, if it is judged that the current temperature of the meat food is less than the first temperature threshold $t_0$ in the S2, the S6 is then performed.

Further, if it is judged that the meat food has not been frozen yet during the cooling operation in the S4, the performance of the S3 is continued.

Further, the S4 specifically includes:
judging whether the meat food has a lowest temperature point during the cooling operation, and judging that the meat food is frozen during the cooling operation if the lowest temperature point occurs and the temperature elevation amount in a preset continuous time period starting from the lowest temperature point is greater than or equal to a preset temperature change amount; wherein the length of the preset continuous time period starting from the lowest temperature point is less than or equal to a first time length threshold;
and/or,
judging whether a case that the temperature of the meat food remains unchanged during the preset continuous time period occurs during the cooling operation, and if yes, judge that the meat food is frozen during the cooling operation, wherein the length of the preset continuous time period is greater than or equal to a second time length threshold.

Further, the S1 specifically includes:
acquiring the current temperature of the meat food in the compartment of the refrigerator using a plurality of temperature sensors;
correspondingly, the S4 specifically includes:
simultaneously judging whether the meat food is frozen during the cooling operation using a plurality of temperature sensors and taking the judgment result of the temperature sensor judging that the meat food has been frozen during the cooling operation at the first time as the criterion.

Further, the S3 specifically includes:
controlling the compartment to perform a cooling operation according to an initial target temperature $T_0$, and the initial target temperature $T_0$ ranging from −10° C. to −1° C.

Further, the S3 specifically includes:
controlling the compartment to perform a cooling operation according to a first target temperature $T_1$, and continuously controlling the compartment to perform a cooling operation according to a second target temperature $T_2$ after the current temperature of the meat food has been cooled down to $t_0$, $T_1<T_2$.

Further, the S3 specifically includes:

control a damper of the compartment to be fully opened and performing the cooling operation according to the initial target temperature $T_0$, and control the damper of the compartment to be half-opened and continuously perform the cooling operation according to the initial target temperature $T_0$ after the current temperature of the meat food has been cooled down to $t_0$.

Further, the S6 specifically includes:

controlling the compartment to perform a heating operation according to a third target temperature $T_3$, and the third target temperature $T_3$ ranging from $-1°$ C. to $4°$ C.

Further, the compartment is one or more of the following:

a variable temperature chamber of the refrigerator or a variable temperature region isolated by the variable temperature chamber, a variable temperature drawer in a refrigerating compartment of the refrigerator or a variable temperature region isolated by the variable temperature drawer, and a variable temperature drawer in a freezing compartment of the refrigerator or a variable temperature region isolated by the variable temperature drawer.

Further, the method further includes:

sending a reminder information to a user if it is judged that the storage time of the meat food in the compartment of the refrigerator exceeds a preset number of days.

According to a second aspect, the present disclosure also provides a controller, including:

a temperature acquisition module configured to acquire a current temperature of meat food in a compartment of a refrigerator in real time;

a first judgment module configured to judge whether the current temperature of the meat food is greater than or equal to a first temperature threshold $t_0$, wherein the first temperature threshold is a temperature value that keeps the meat food in a partial-freezing and easy-to-cut state;

a first control module configured to control the compartment to perform a cooling operation when the first judgment module judges that the current temperature of the meat food is greater than or equal to the first temperature threshold $t_0$;

a second judgment module configured to judge whether the meat food is frozen during the cooling operation.

a timing module configured to start timing from the occurrence of freezing when the second judgment module judges that that the meat is frozen during the cooling operation; and a second control module configured to control the compartment to perform a heating operation after the timing by the timing module reaches a first preset time period.

Further, the second control module is further configured to control the compartment to perform a heating operation when the first judgment module judges that the current temperature of the meat food is less than the first temperature threshold $t_0$.

Further, the first control module is further configured to control the compartment to perform the cooling operation when the second judgment module judges that the meat food has not been frozen yet during the cooling operation.

Further, the second judgment module is specifically configured to:

judge whether the meat food has a lowest temperature point during the cooling operation, and judge that the meat food is frozen during the cooling operation if the lowest temperature point occurs and the temperature elevation amount in a preset continuous time period starting from the lowest temperature point is greater than or equal to a preset temperature change amount; wherein the length of the preset continuous time period starting from the lowest temperature point is less than or equal to a first time length threshold;

and/or, judge whether a case that the temperature of the meat food remains unchanged during the preset continuous time period occurs during the cooling operation, and if yes, judge that the meat food is frozen during the cooling operation, wherein the length of the preset continuous time period is greater than or equal to a second time length threshold.

Further, the temperature acquisition module is specifically configured to acquire the current temperature of the meat food in the compartment of the refrigerator using a plurality of temperature sensors;

correspondingly, when the second judgment module judges whether the meat food is frozen during the cooling operation, it is specifically configured to:

simultaneously judging whether the meat food is frozen during the cooling operation using a plurality of temperature sensors and taking the judgment result of the temperature sensor judging that the meat food has been frozen during the cooling operation at the first time as the criterion.

Further, when the first control module controls the compartment to perform the cooling operation, it is specifically configured to:

controlling the compartment to perform the cooling operation according to an initial target temperature $T_0$, and the initial target temperature $T_0$ ranging from $-10°$ C. to $-1°$ C.

Further, when the first control module controls the compartment to perform the cooling operation, it is specifically configured to:

control the compartment to perform a cooling operation according to a first target temperature $T_1$, and continuously control the compartment to perform a cooling operation according to a second target temperature $T_2$ after the current temperature of the meat food has been cooled down to $t_0$, $T_1<T_2$.

Further, when the first control module controls the compartment to perform the cooling operation, it is specifically configured to:

control a damper of the compartment to be fully opened and performing the cooling operation according to the initial target temperature $T_0$, and control the damper of the compartment to be half-opened and continuously perform the cooling operation according to the initial target temperature $T_0$ after the current temperature of the meat food has been cooled down to $t_0$.

Further, when the second control module controls the compartment to perform the heating operation, it is specifically configured to:

control the compartment to perform the heating operation according to a third target temperature $T_3$, and the third target temperature $T_3$ ranges from $-1°$ C. to $4°$ C.

Further, the compartment is one or more of the following:

a variable temperature chamber of the refrigerator or a variable temperature region isolated by the variable temperature chamber, a variable temperature drawer in a refrigerating compartment of the refrigerator or a variable temperature region isolated by the variable temperature drawer, and a variable temperature drawer in a freezing compartment of the refrigerator or a variable temperature region isolated by the variable temperature drawer.

Further, the controller further includes:

a reminding module configured to send a reminder information to a user if it is determined that the storage time of the meat food in the compartment of the refrigerator exceeds a preset number of days.

According to a third aspect, the present disclosure provides a refrigerator, comprising the controller of any of the embodiments above.

According to the technical solutions above, the partial-freezing meat fresh-preservation control method provided by the present disclosure detects the temperature of the meat food placed in the compartment in real time, controls the compartment to perform a low-temperature operation to cool the meat food if the temperature of the meat food is greater than or equal to the first temperature threshold $t_0$ (for example, the meat food is normal temperature meat), meanwhile starts timing to reach a time period from the occurrence of the freezing if it is detected that the meat food is frozen during the operation of cooling the meat food, and then elevates a set temperature of the compartment, decreases the refrigerating capacity so that the meat is kept in a partial-freezing and easy-to-cut state for a long time, and the cooling-warming switching frequency can be reduced as much as possible while avoiding too hard freezing of the meat, thereby ensuring the quality of the meat food. When the meat is gradually warmed up due to the decrease in the cooling amount, it is necessary to control the temperature of the meat food to be below to $t_0$ ensure that the meat food in the compartment is always in a partial-freezing and easy-to-cut state, and then the loop is repeated. It can be seen that the present disclosure can keep the meat food fresh and easy to cut for a long time and solves the defects in the prior art that the fresh-preservation period is too short if the temperature is too high, or there is a risk of being hard due to be frozen if the temperature is too low. The present disclosure realizes the long-term maintenance of the partial-freezing and easy-to-cut state, that is, prolongs the duration of the fresh and easy-to-cut state of the meat, for example, the fresh and easy-to-cut period of the meat can be achieved for more than 15 days.

BRIEF DESCRIPTION OF THE DRAWINGS

In order to more clearly illustrate the technical solutions disclosed in the embodiments of the present disclosure or the prior art, the drawings used in the descriptions of the embodiments or the prior art will be briefly described below. Obviously, the drawings in the following description are only certain embodiments of the present disclosure, and other drawings can be obtained according to these drawings without any creative work for those skilled in the art.

FIG. 12 is another schematic structural diagram of a controller according to another embodiment of the present disclosure;

DETAILED DESCRIPTION

In order to make the object, technical solutions and advantages of the embodiments of the present disclosure more clear, the technical solutions in the embodiments of the present disclosure are clearly and completely described in the following in conjunction with the accompanying drawings in the embodiments of the present disclosure. Obviously, the described embodiments are part of the embodiments of the present disclosure, and not all of the embodiments. All other embodiments obtained by a person of ordinary skill in the art based on the embodiments of the present disclosure without any creative work belong to the scope of the present disclosure.

Figure 1:
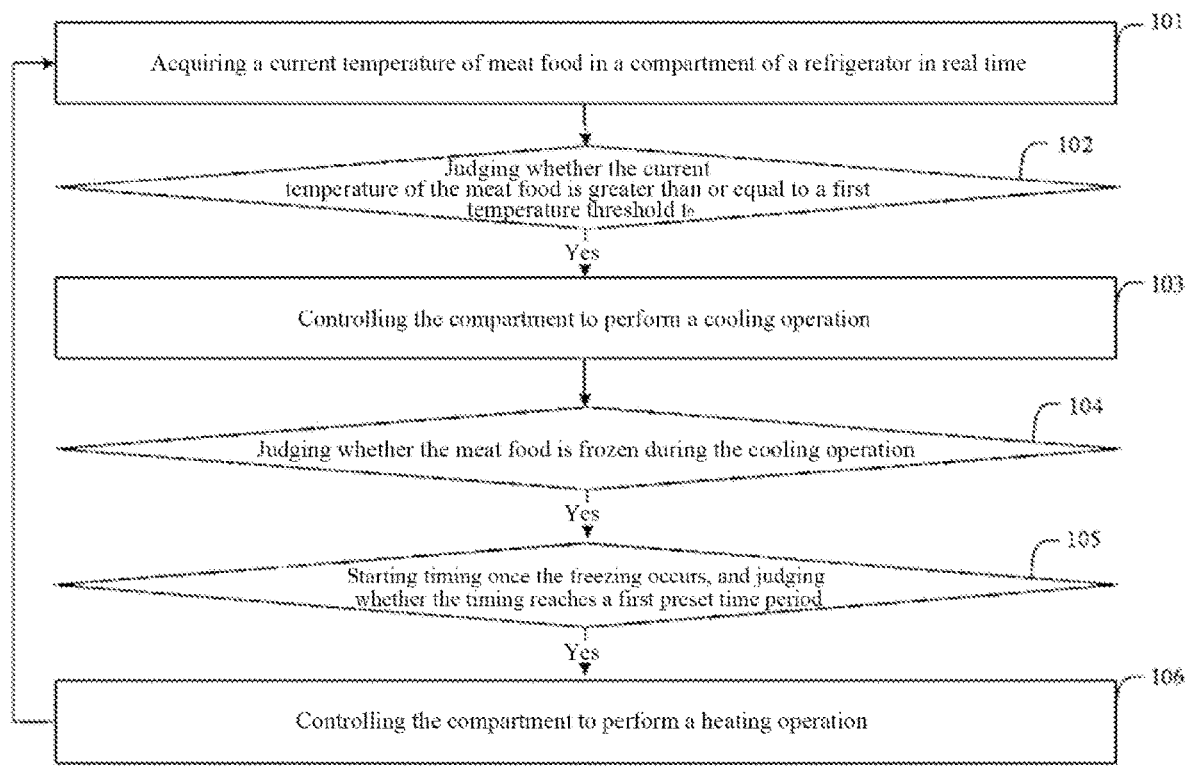
FIG. 1 is a flow chart of a partial-freezing meat fresh-preservation control method according to an embodiment of the present disclosure.

An embodiment of the present disclosure provides a flow chart of a partial-freezing meat fresh-preservation control method. Referring to FIG. 1, the method includes the following steps.

Step 101: a current temperature of meat food in a compartment of a refrigerator is acquired in real time.

In this step, the compartment may be a variable temperature chamber of the refrigerator, a variable temperature drawer in a refrigerating compartment of the refrigerator or a variable temperature drawer in a freezing compartment of the refrigerator. Of course, in order to make more reasonable use of the refrigerator space, the variable temperature chamber of the refrigerator, the variable temperature drawer in the refrigerating compartment of the refrigerator, or the variable temperature drawer in the freezing compartment of the refrigerator may be isolated into a plurality of variable temperature regions, so that each variable temperature region isolated can also be regarded as a compartment. That is, the compartment in this embodiment may be understood as multiple spaces as long as the temperature environment in the compartment is adjustable (for example, a temperature environment of −10 to 8° C. can be achieved).

It can be understood that when the variable temperature chamber of the refrigerator, the variable temperature drawer in the refrigerating compartment of the refrigerator, or the variable temperature drawer in the freezing compartment of the refrigerator are isolated into a plurality of variable temperature regions, an air supply and return structure can be separately provided for each region (multiple individual dampers or many-driven-by-one damper design can be used), or a size-fine-tunable baffle structure that can slide towards the left or right can also be flexibly designed so that users can adjust the size of each region; in addition, the temperature detection and cooling control of each region can be performed completely independently.

In this step, the meat food in the compartment of the refrigerator may be meat such as chicken, pork, duck, beef, fish, and the like;

Step 102: whether the current temperature of the meat food is greater than or equal to a first temperature threshold $t_0$ is judged, and if yes, step 103 is then performed.

In this step, the first temperature threshold is a temperature value that keeps the meat food in a partial-freezing and easy-to-cut state; for example, the first temperature threshold $t_0$ ranges from $-6 < t_0 \leq 0$ so as to ensure that the meat food in the compartment is always in a partial-freezing and easy-to-cut state.

Step 103: the compartment is controlled to perform a cooling operation.

In this step, the compartment is controlled to perform the cooling operation to cool the meat food if it is judged that the current temperature of the meat food is greater than or equal to a first temperature threshold $t_0$ (for example, the meat is normal temperature meat).

It can be understood that when the compartment is controlled to perform the cooling operation, the temperature of the compartment can be set as needed, for example, set to −8° C., that is, the compartment is controlled to perform the cooling operation with −8° C. as the target temperature. Of course, in order to ensure that a freezing or phase transformation of the meat food can occur during the cooling operation, the target temperature set herein during the cooling operation of the compartment cannot be excessively high, and should be at least a temperature below zero, preferably −10° C. to −1° C.

Step 104, whether the meat food is frozen during the cooling operation is judged, and if yes, step 105 is performed.

Step 105, timing is started once the freezing occurs, and step 106 is performed after the timing reaches a first preset time period.

In this step, the length of the first preset time period is generally several hours, for example, 2 to 6 hours. It can be understood that the length of the first preset time period should not be too long to prevent the meat from being seriously frozen. Of course, the length of the first preset time period should not be too short, otherwise it will cause frequent warming-cooling switching.

Step 106: the compartment is controlled to perform a heating operation.

Wherein, after the performance of the step 106 is completed, the performance of the step 101 is continued.

In combination with the steps 105 and 106 above, it can be known that after timing for a time period from the occurrence of the freezing, the set temperature of the compartment is elevated, the refrigerating capacity is decreased so that the meat is kept in a partial-freezing and easy-to-cut state for a long time, the cooling-warming switching frequency can be reduced as much as possible while avoiding the hard freezing of the meat, thereby ensuring the quality of the meat food. It can be understood that when the meat is gradually warmed up due to the decrease in the cooling amount, the temperature of the meat food is controlled to be below to $t_0$ ensure that the meat food in the compartment is always in a partial-freezing and easy-to-cut state, and then the loop is repeated.

Figure 2:
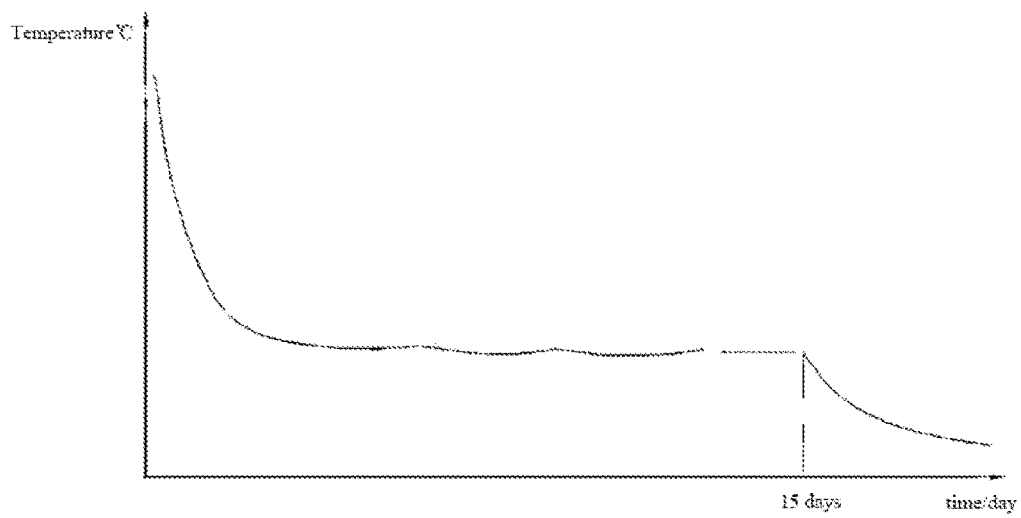
FIG. 2 is a schematic diagram showing a temperature change curve obtained after normal temperature meat is placed in a compartment using the partial-freezing meat fresh-preservation control method according to an embodiment of the present disclosure.

Referring to FIG. 2, which is a schematic diagram showing a temperature change curve obtained after normal temperature meat is placed in a compartment using the partial-freezing meat fresh-preservation control method according to an embodiment of the present disclosure. It can be seen from FIG. 2 that the partial-freezing fresh-preservation control method provided by the embodiment of the present disclosure may maintain the meat food in a fresh and easy-to-cut state for a long time, and make up for the technical gap in the field.

For example, by adopting the control method of the embodiments of the present disclosure, the shelf life of the meat can be prolonged up to 15 days, and the partial-freezing, easy-to-cut and fresh-preservation period prolonged effects can be achieved. It can be understood that the temperature change curve after 15 days in FIG. 2 (the rapid drop section of the end portion in FIG. 2) is not obtained by the control method described in the embodiment of the present disclosure, but the meat food is frozen for preservation. It can be understood that if the meat food has not been eaten after it is partially frozen and preserved for 15 days using the control method described in this embodiment, it is generally recommended to carry out deep frozen preservation to prevent the deterioration of the meat food.

It can be understood that, in this embodiment, at least two temperature detection devices are needed in the compartment, and the temperature detection device may be an ordinary temperature sensor, an infrared sensor, or any other device capable of detecting temperature. One temperature detection device is used to monitor the temperature of the placed meat, and the other temperature detection device is used to control the temperature of the compartment.

In addition, the control method provided by the embodiment of the present disclosure can also be applied to a liquid beverage, so that the liquid beverage can always maintain a partial freezing state, that is, it is always in a cool and non-frozen state, thereby meeting the demand of some users for ice cold drinks.

According to the technical solutions recorded above, the partial-freezing meat fresh-preservation control method provided by the embodiments of the present disclosure detects the temperature of the meat food placed in the compartment in real time, controls the compartment to perform a low-temperature operation to cool the meat food if the temperature of the meat food is greater than or equal to the first temperature threshold $t_0$ (for example, the meat food is normal temperature meat), meanwhile starts timing to reach a time period from the occurrence of the freezing if it is detected that the meat food is frozen during the operation of cooling the meat food, and then elevates a set temperature of the compartment, decreases the refrigerating capacity so that the meat is kept in a partial-freezing and easy-to-cut state for a long time, and the cooling-warming switching frequency can be reduced as much as possible while avoiding too hard freezing of the meat, thereby ensuring the quality of the meat. When the meat is gradually warmed up due to the decrease in the cooling amount, it is necessary to control the temperature of the meat to be below to $t_0$ ensure that the meat food in the compartment is always in a partial-freezing and easy-to-cut state, and then the loop is repeated. It can be seen that the embodiments of the present disclosure can keep the meat food fresh and easy to cut for a long time and solves the defects in the prior art that the fresh-preservation period is too short if the temperature is too high, or there is a risk of being hard due to be frozen if the temperature is too low. The embodiments of the present disclosure realizes the long-term maintenance of the partial-freezing and easy-to-cut state, that is, prolongs the duration of the fresh and easy-to-cut state of the meat, for example, the fresh and easy-to-cut period of the meat can be achieved for more than 15 days.

Figure 3:
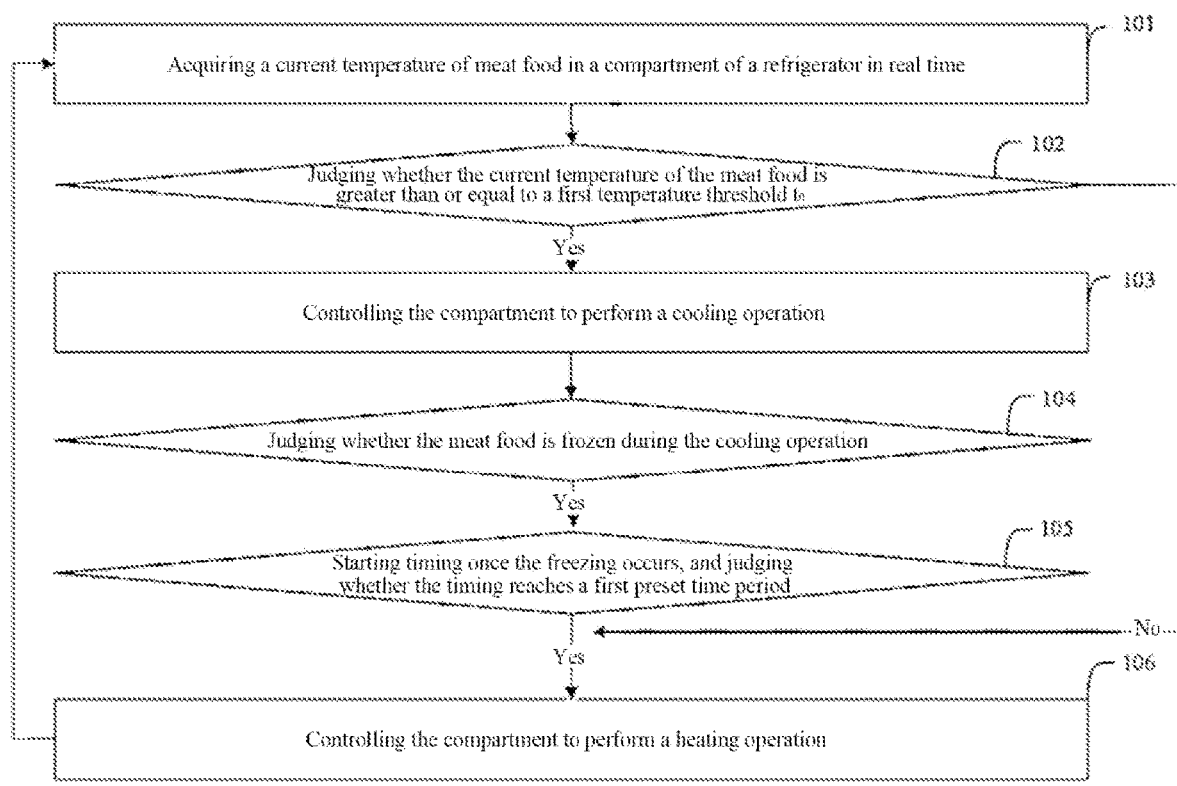
FIG. 3 is a flow chart of a partial-freezing meat fresh-preservation control method in a first alternative implementation according to an embodiment of the present disclosure.

In an alternative embodiment, referring to FIG. 3, if it is judged that the current temperature of the meat food is less than the first temperature threshold $t_0$ in the step 102, then the step 106 is directly performed.

It can be seen that in the alternative implementation, the temperature of the meat food in the compartment is detected in real time, and the compartment is controlled to perform a low-temperature operation to cool the meat food if the temperature of the meat food is greater than or equal to the first temperature threshold $t_0$ (for example, the meat food is normal temperature meat); the compartment is controlled to perform high-temperature thawing so as to prevent the meat food from continuing freezing if the temperature of the meat food is lower than the first temperature threshold $t_0$ (for example, the meat food is frozen meat). When the meat food is subjected to high-temperature thawing, it is necessary to detect the temperature of the meat food in real time, and if the temperature of the meat food is again greater than or equal to the first temperature threshold $t_0$, the compartment is re-controlled to perform the low-temperature operation to cool the meat food, so as to ensure that the meat food in the compartment is always in a partial-freezing and easy-to-cut state. Since it is intended to keep the meat in a partial-freezing and easy-to-cut state, when the compartment is controlled to perform the heating operation, the target temperature of the heating operation should not be excessively high, so as to prevent the warming temperature of the meat food in the compartment from being too high and too fast and directly skipping partial-freezing state, and it is preferable that the value range of the target temperature during the heating operation is −1 to 4° C., for example, 3° C.

Figure 4:
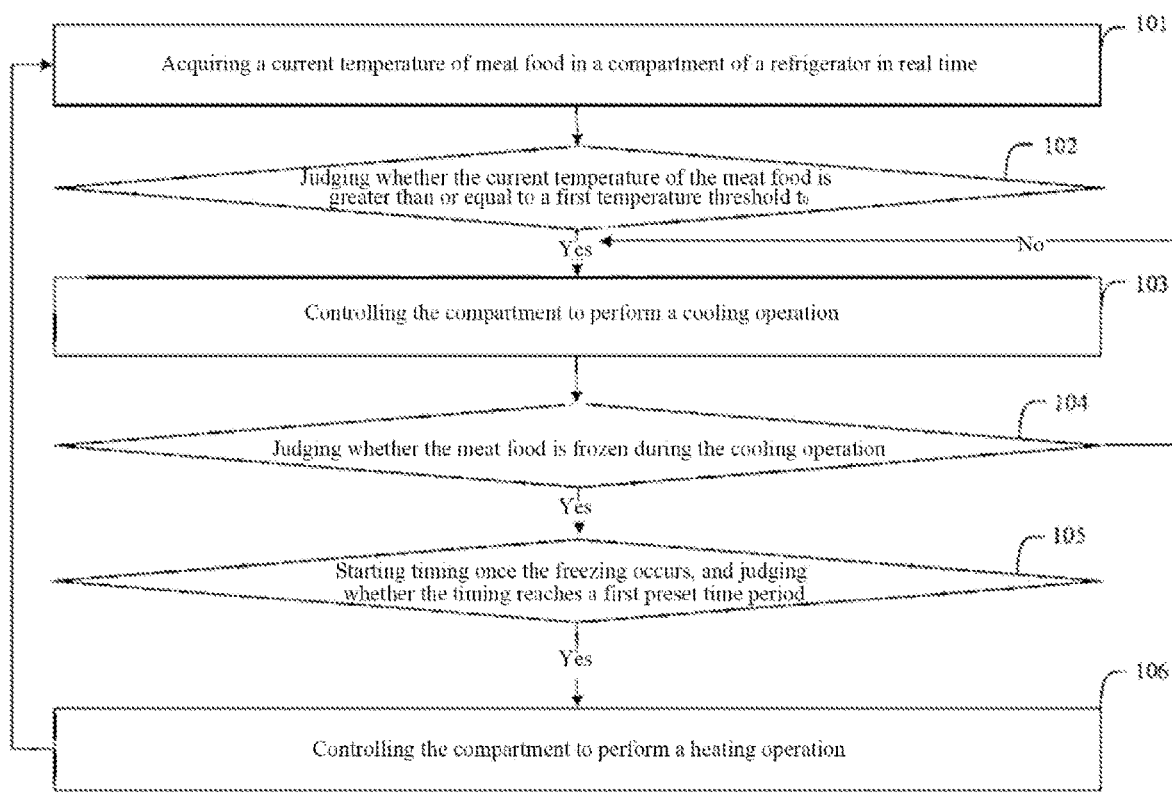
FIG. 4 is a flow chart of a partial-freezing meat fresh-preservation control method in a second alternative implementation according to an embodiment of the present disclosure.

In an alternative implementation, referring to FIG. 4, if it is judged that the meat food has not been frozen yet during the cooling operation in the step 104, the performance of the step 103 is then continued.

In the alternative implementation, if it is judged that the meat food has not been frozen yet during the cooling operation in the step 104, it means that the temperature of the meat food is insufficiently cooled, and it is necessary to continue the performance of the step 103 to continuously cool the meat food down.

It can be understood that the two alternative implementations of FIGS. 3 and 4 can be used in combination, and in this case, no further details are provided herein.

In an alternative embodiment, whether the meat food is frozen during the cooling operation can be judged in the step 104 by using any one or both of the following two judgment modes:

mode 1: judging whether the meat food has a lowest temperature point during the cooling operation, and judging that the meat food is frozen during the cooling operation if the lowest temperature point occurs and the temperature elevation amount in a preset continuous time period starting from the lowest temperature point is greater than or equal to a preset temperature change amount (the preset temperature change amount ranging from 1 to 2° C.); wherein the length of the preset continuous time period starting from the lowest temperature point is less than or equal to a first time length threshold. For example, the first time length threshold ranges from 5 to 10 minutes.

It should be understood that the lowest temperature point described herein refers to the lowest temperature point before the temperature of the meat food is elevated during the freezing operation. Because the temperature of the meat food suddenly has a slightly higher temperature during the freezing operation and then continues to drop, the temperature point ahead of the point of this slightly higher temperature is the lowest point described here, which can also be understood as a pole.

Mode 2: judging whether a case that the temperature of the meat food remains unchanged during a preset continuous time period occurs during the cooling operation, and if yes, judging that the meat food is frozen during the cooling operation, wherein the length of the preset continuous time period is greater than or equal to a second time length threshold. For example, the second time length threshold ranges from 0.5 to 2 hours.

It can be understood that the two modes above are used to actually judge the freezing nodes in the two cases that the meat is in an overcooled state and in a non-overcooled state during the cooling operation.

It can be further understood that the cooling termination point in this embodiment is the phase transformation sudden-rise point of the temperature (the mode 1 above) or the phase transformation stable section (the mode 2 above).

Figure 5:
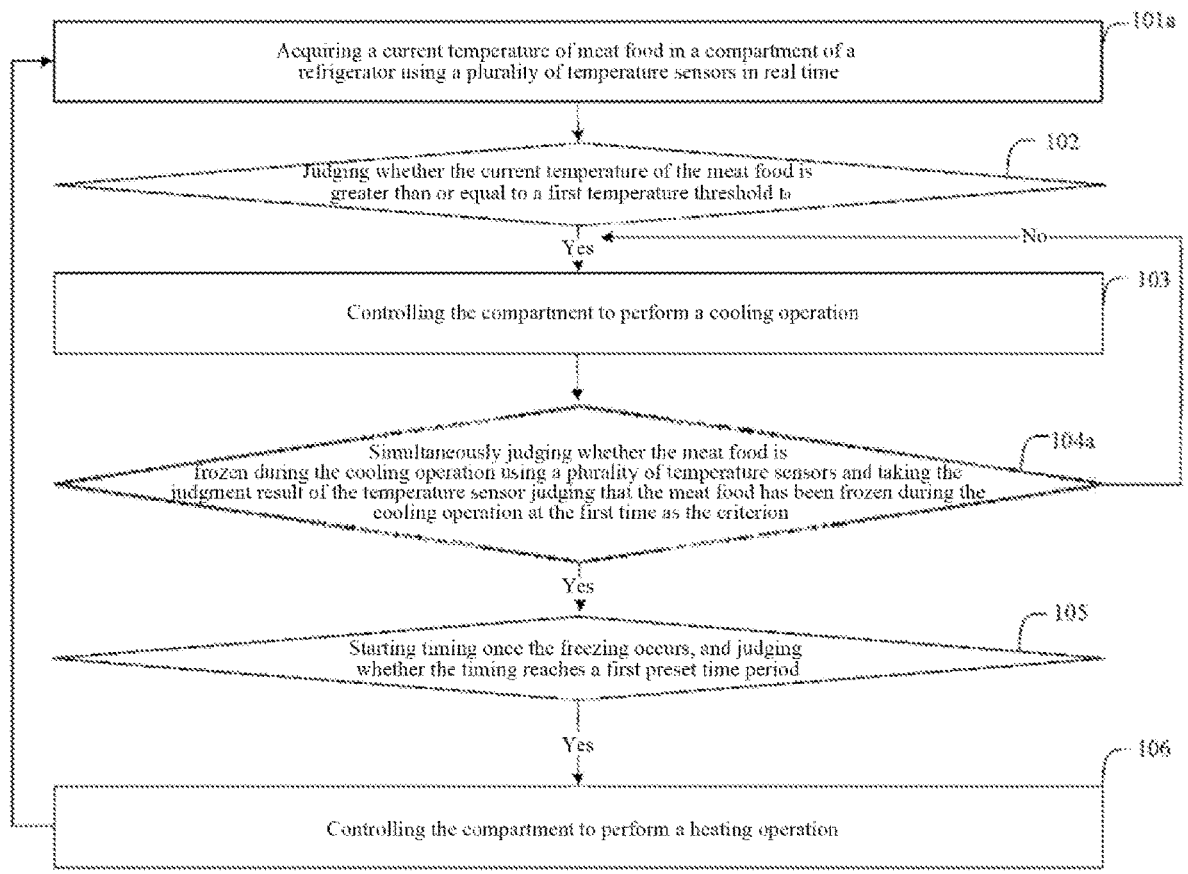
FIG. 5 is a flow chart of a partial-freezing meat fresh-preservation control method in a third alternative implementation according to an embodiment of the present disclosure.

In an alternative implementation, referring to FIG. 5, when the current temperature of the meat food in the compartment of the refrigerator is acquired in real time in the step 101, the step 101 specifically includes:

step 101a: acquiring the current temperature of the meat food in the compartment of the refrigerator using a plurality of temperature sensors in real time;

correspondingly, the judging whether the meat food is frozen during the cooling operation in the step 104 specifically includes:

step 104a: simultaneously judging whether the meat food is frozen during the cooling operation using a plurality of temperature sensors and taking the judgment result of the temperature sensor judging that the meat food has been frozen during the cooling operation at the first time as the criterion.

It can be seen that in the alternative implementation, a plurality of temperature sensors are used to judge whether the meat food is frozen during the cooling operation to ensure that the freezing phenomenon of the meat food can be accurately and timely discovered. When a certain temperature sensor judges that the meat food is frozen during the cooling operation at the first time, the subsequent warming process is performed immediately to ensure that the meat food does not be frozen by taking the judgment result of this temperature sensor as a criterion.

In addition, during the entire control process, the plurality of temperature sensors can always compare the temperatures. If temperatures detected by more than two temperature sensors are below a certain value (for example, −10° C.), it means that there is a large amount of frozen meat placed into the compartment, and it is necessary to forcibly perform the step 106 to control the warming at this time.

Figure 6:
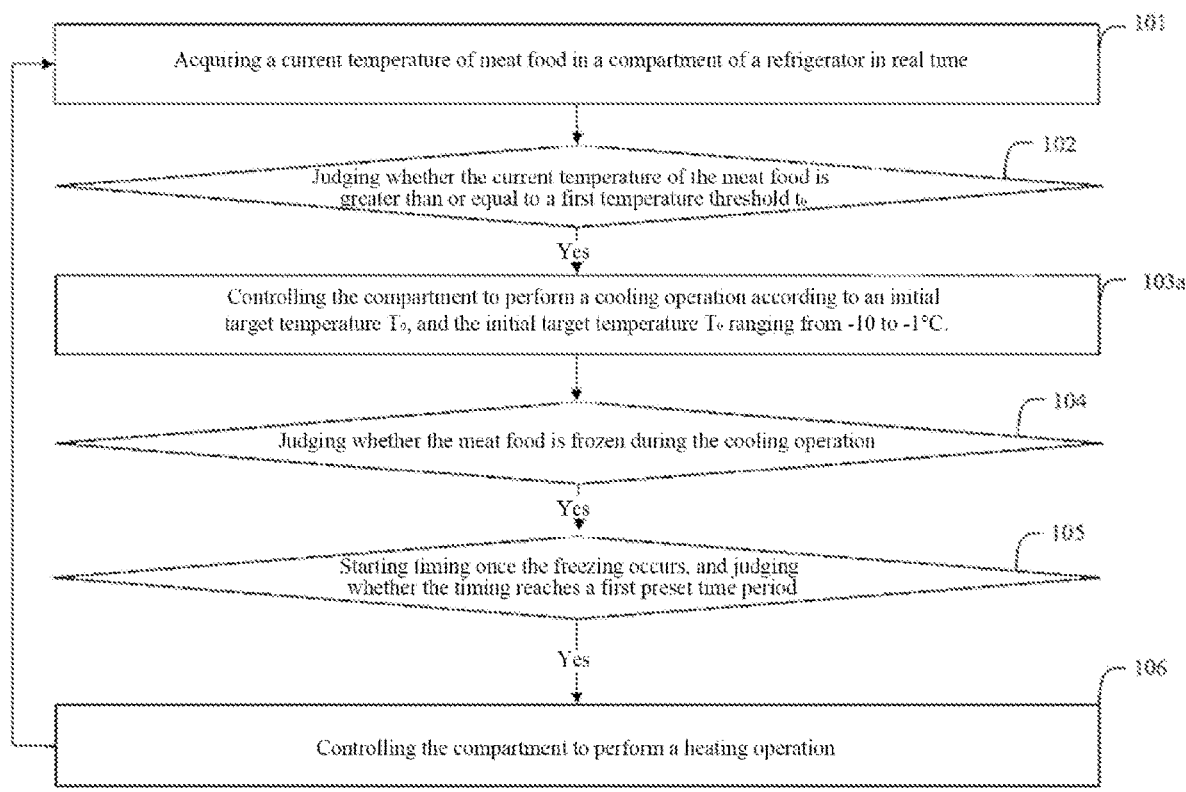
FIG. 6 is a flow chart of a partial-freezing meat fresh-preservation control method in a fourth alternative implementation according to an embodiment of the present disclosure.

In an alternative embodiment, referring to FIG. 6, the step 103 specifically includes:

step 103a: controlling the compartment to perform a cooling operation according to an initial target temperature $T_0$, and the initial target temperature $T_0$ ranging from $-10°$ C. to $-1°$ C.

In the present implementation, the compartment is controlled to perform a cooling operation according to the initial target temperature $T_0$ to ensure that the meat in the compartment is quickly cooled to a frozen state to keeping the fresh component as much as possible.

Figure 7:
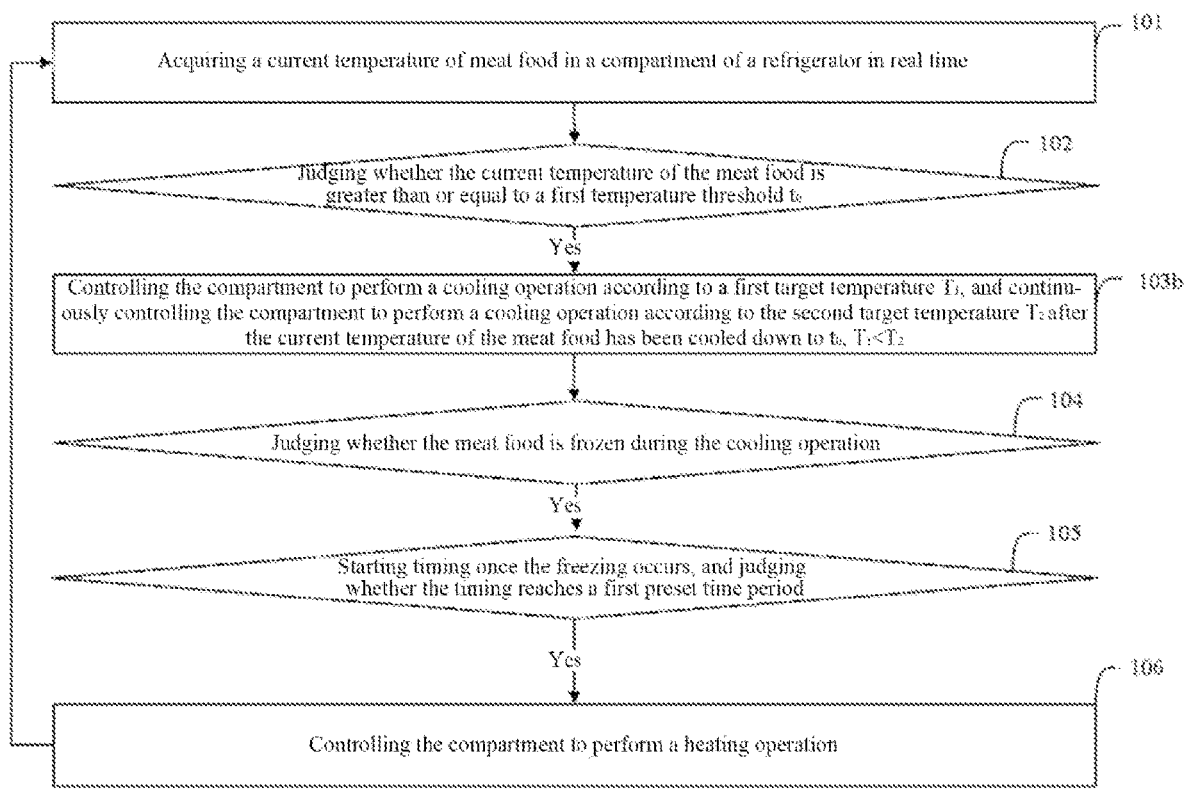
FIG. 7 is a flow chart of a partial-freezing meat fresh-preservation control method in a fifth alternative implementation according to an embodiment of the present disclosure.

In another alternative embodiment, different from the alternative embodiments above, referring to FIG. 7, the step 103 specifically includes:

step 103b: controlling the compartment to perform a cooling operation according to a first target temperature $T_1$, and continuously controlling the compartment to perform a cooling operation according to a second target temperature $T_2$ after the current temperature of the meat food has been cooled down to $t_0$, $T_1 < T_2$.

Unlike the alternative embodiment above, in the present embodiment, the cooling operation is divided into two stages, and the target temperature setting value is controlled so that earlier stage of the cooling operation operates at a lower temperature and the cooling amount is larger, the meat food is quickly brought to the to level, and then the set temperature is elevated, so that the meat food slowly enters the overcooled or freezing process, thereby effectively prolonging the storage time at low temperatures.

Figure 8:
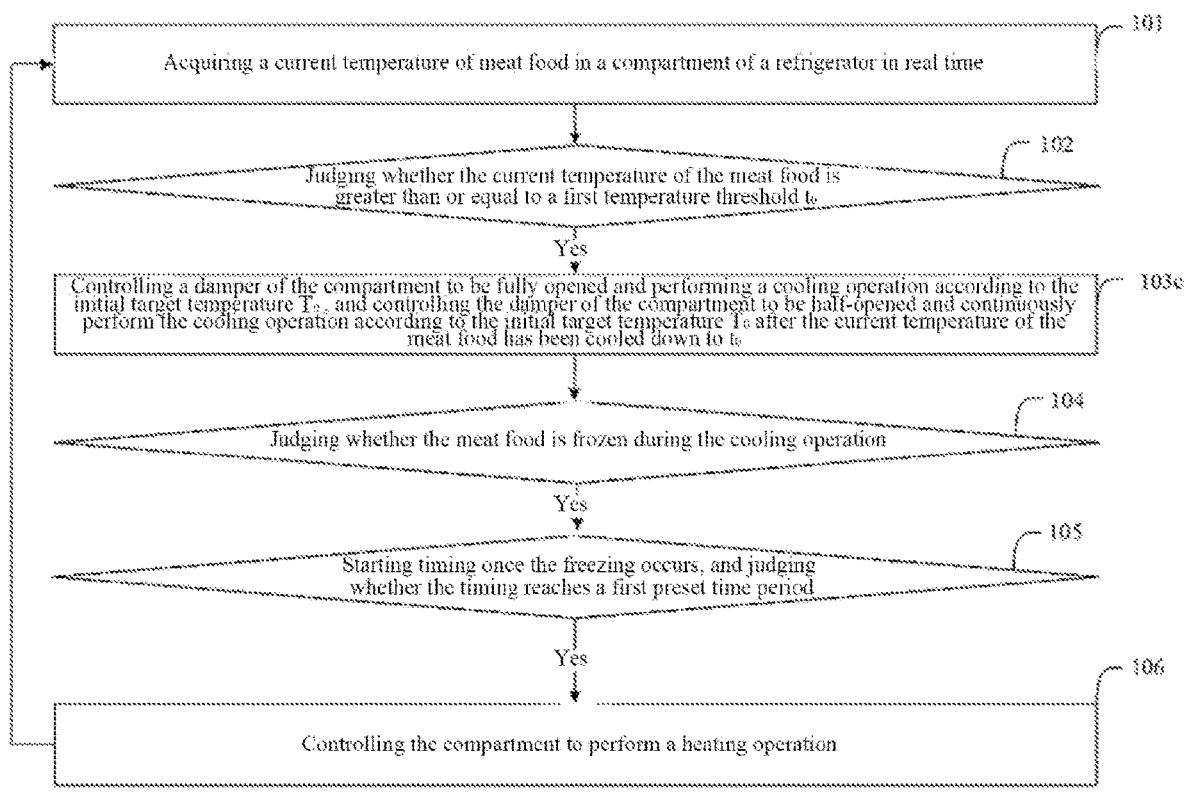
FIG. 8 is a flow chart of a partial-freezing meat fresh-preservation control method in a sixth alternative implementation according to an embodiment of the present disclosure.

In still another alternative implementation, unlike two alternative embodiments above, referring to FIG. 8, the step 103 specifically includes:

step 103c: controlling a damper of the compartment to be fully opened and performing a cooling operation according to the initial target temperature $T_0$, and controlling the damper of the compartment to be half-opened and continuously perform a cooling operation according to the initial target temperature $T_0$ after the current temperature of the meat food has been cooled down to $t_0$.

Unlike the two alternative embodiment above, in the present embodiment, the cooling operation is divided into two stages, and the damper of the compartment is controlled to be fully opened and half-opened so that the cooling amount at the earlier stage of the cooling operation is larger, the meat food is quickly brought to the to level, and then the damper is controlled to be half-opened, so that the cooling amount is decreased, the meat food slowly enters the overcooled or freezing process, thereby effectively prolonging the storage time at low temperatures.

Figure 9:
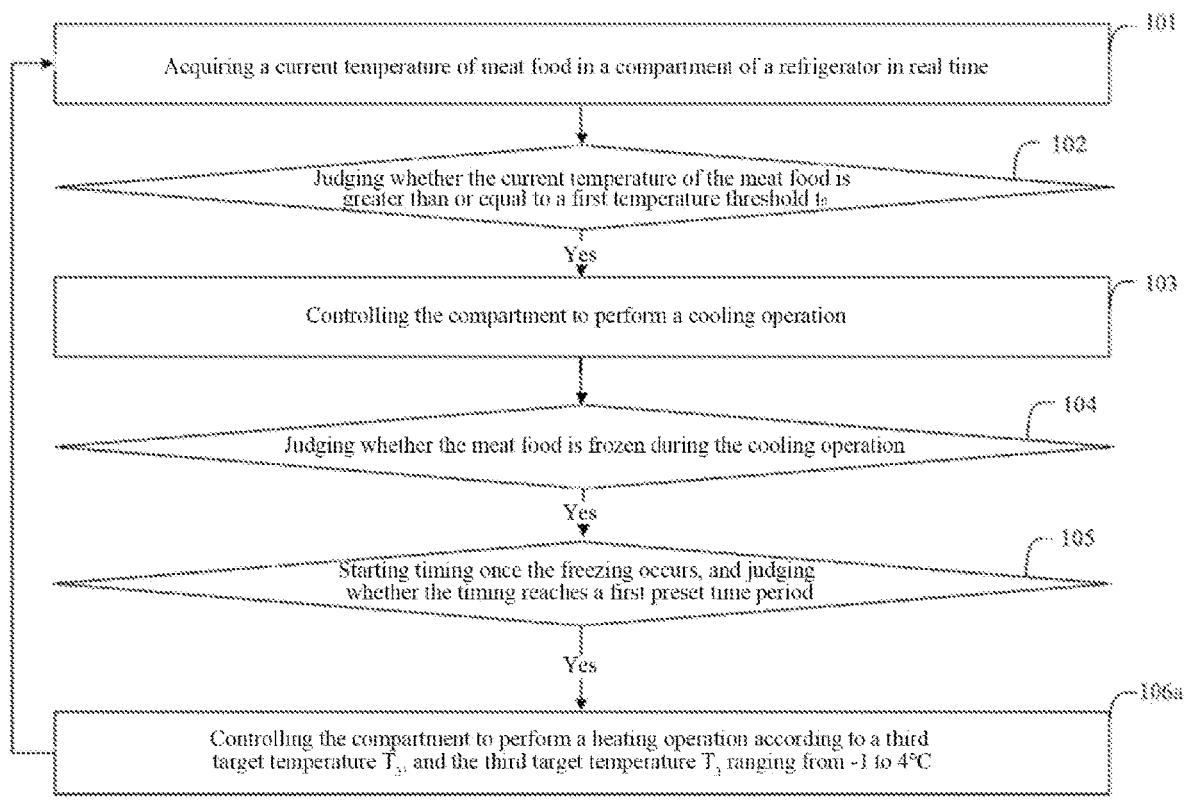
FIG. 9 is a flow chart of a partial-freezing meat fresh-preservation control method in a seventh alternative implementation according to an embodiment of the present disclosure.

In an alternative implementation, referring to FIG. 9, the step 106 specifically includes:

step 106a: controlling the compartment to perform a heating operation according to a third target temperature $T_3$, and the third target temperature $T_3$ ranging from $-1°$ C. to $4°$ C.

In the present implementation, the compartment is controlled to perform a heating operation according to the third target temperature $T_3$ to ensure that the meat food in the compartment is not excessively and quickly warmed and the partially freezing state is not directly skipped.

Figure 10:
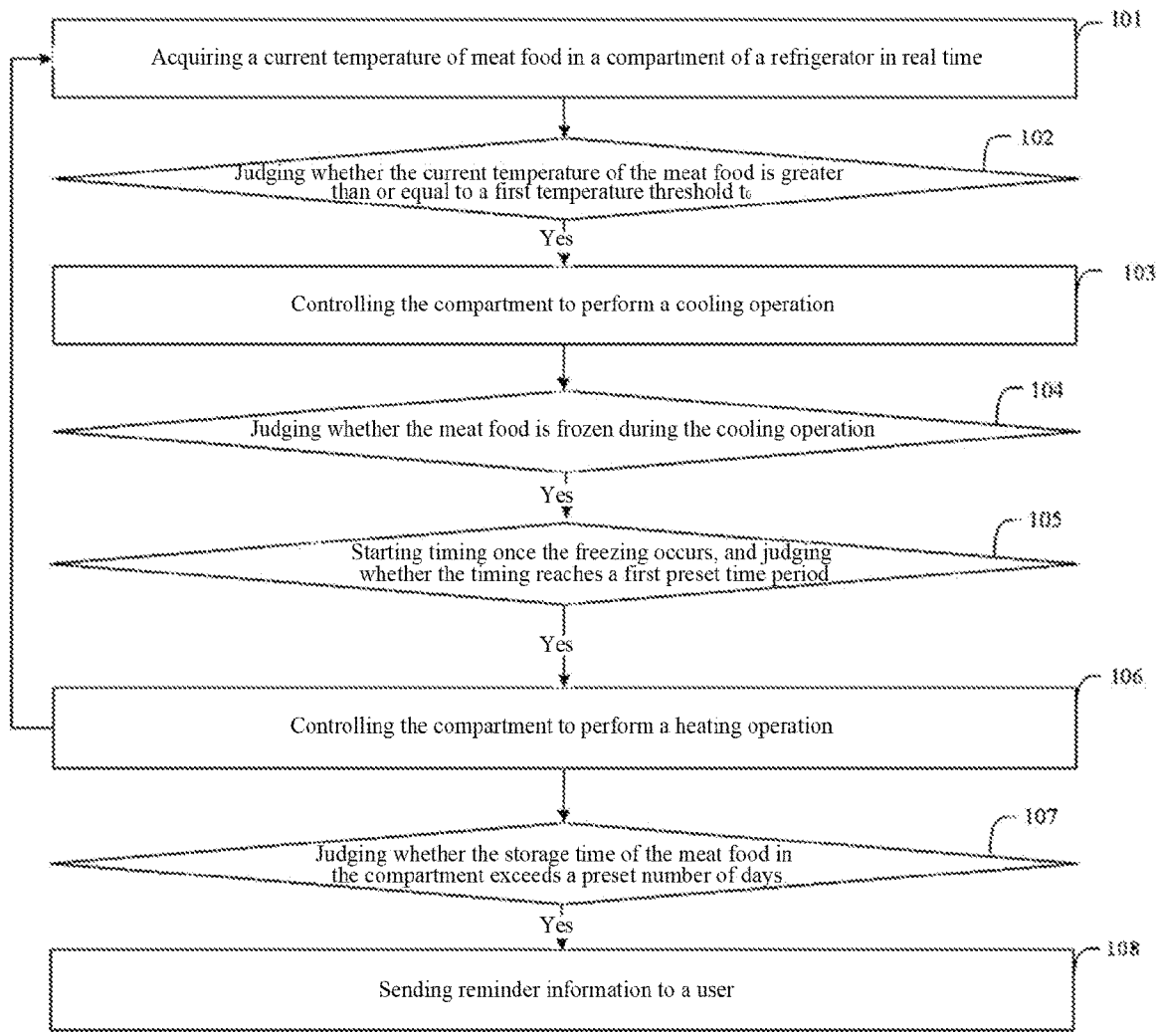
FIG. 10 is a flow chart of a partial-freezing meat fresh-preservation control method in an eighth alternative implementation according to an embodiment of the present disclosure.

In an alternative implementation, referring to FIG. 10, the method also includes step 107 and step 108.

Step 107: whether the storage time of the meat food in the compartment exceeds a preset number of days is judged, and if yes, then the step 108 is performed.

Step 108: a reminder information is sent to a user.

In this alternative embodiment, the user is reminded to take out the food in time for eating by sending the reminder information to the user after the storage time of the meat food in the compartment is judged. For example, when the user opens the compartment, there is a reminder signal such as an indicator light or blinking, or corresponding reminder information is directly displayed on the display screen. In addition, the reminder function can also be implemented through the mobile phone software, for example, the reminder information is pushed to the mobile phone software, and the user is informed of the reminder information through the mobile phone software.

It can be understood that the foregoing various alternative embodiments may be combined in any manner and the present disclosure does not limit this.

Figure 11:
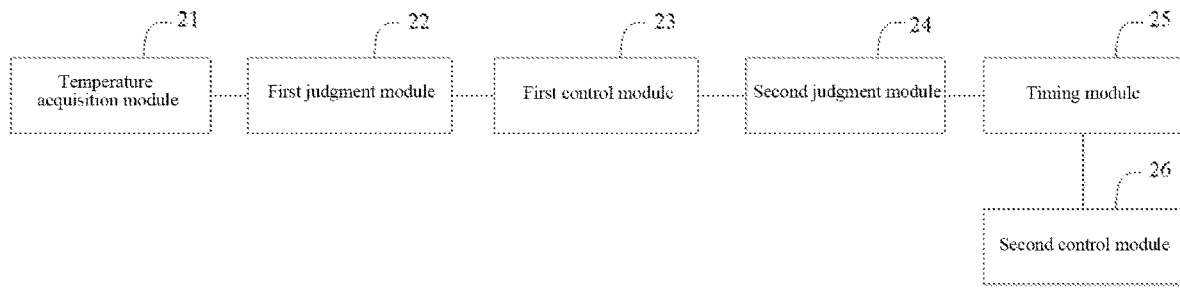
FIG. 11 is a schematic structural diagram of a controller according to another embodiment of the present disclosure.

Based on the same inventive concept, another embodiment of the present disclosure provides a controller. Referring to FIG. 11, the controller includes: a temperature acquisition module 21, a first judgment module 22, a first control module 23, and a second judgment module 24, a timing module 25 and a second control module 26;

the temperature acquisition module 21 is configured to acquire a current temperature of meat food in a compartment of a refrigerator in real time;

the first judgment module 22 is configured to judge whether the current temperature of the meat food is greater than or equal to a first temperature threshold $t_0$, wherein the first temperature threshold is a temperature value that keeps the meat food in a partial-freezing and easy-to-cut state;

the first control module 23 is configured to control the compartment to perform a cooling operation when the first judgment module judges that the current temperature of the meat food is greater than or equal to the first temperature threshold $t_0$;

the second judgment module 24 is configured to judge whether the meat food is frozen during the cooling operation.

the timing module 25 is configured to start timing from the occurrence of freezing when the second judgment module judges that that the meat is frozen during the cooling operation; and the second control module 26 is configured to control the compartment to perform a heating operation after the timing by the timing module reaches a first preset time period.

In an alternative implementation, the second control module 26 is further configured to control the compartment to perform a heating operation when the first judgment module judges that the current temperature of the meat food is less than the first temperature threshold $t_0$.

In an alternative implementation, the first control module 23 is further configured to control the compartment to perform a cooling operation when the second judgment module judges that the meat food has not been frozen yet during the cooling operation.

In an alternative implementation, the second judgment module is specifically configured to:

judge whether the meat food has a lowest temperature point during the cooling operation, and judge that the meat food is frozen during the cooling operation if the lowest temperature point occurs and the temperature elevation amount in a preset continuous time period starting from the lowest temperature point is greater than or equal to a preset temperature change amount; wherein the length of the preset continuous time period starting from the lowest temperature point is less than or equal to a first time length threshold;

and/or, judge whether a case that the temperature of the meat food remains unchanged during the preset continuous time period occurs during the cooling operation, and if yes, judge that the meat food is frozen during the cooling operation, wherein the length of the preset continuous time period is greater than or equal to a second time length threshold.

In an alternative implementation, the temperature acquisition module is specifically configured to acquire the current temperature of the meat food in the compartment of the refrigerator using a plurality of temperature sensors;

correspondingly, when the second judgment module judges whether the meat food is frozen during the cooling operation, it is specifically configured to:

simultaneously judging whether the meat food is frozen during the cooling operation using a plurality of temperature sensors and taking the judgment result of the temperature sensor judging that the meat food has been frozen during the cooling operation at the first time as the criterion.

In an alternative embodiment, when the first control module controls the compartment to perform the cooling operation, it is specifically configured to:

controlling the compartment to perform the cooling operation according to an initial target temperature $T_0$, and the initial target temperature $T_0$ ranging from $-10°$ C. to $-1°$ C.

In an alternative implementation, when the first control module controls the compartment to perform the cooling operation, it is specifically configured to:

control the compartment to perform a cooling operation according to a first target temperature $T_1$, and continuously control the compartment to perform a cooling operation according to a second target temperature $T_2$ after the current temperature of the meat food has been cooled down to $t_0$, $T_1 < T_2$.

In an alternative implementation, when the first control module controls the compartment to perform the cooling operation, it is specifically configured to:

control a damper of the compartment to be fully opened and performing the cooling operation according to the initial target temperature $T_0$, and control the damper of the compartment to be half-opened and continuously perform the cooling operation according to the initial target temperature $T_0$ after the current temperature of the meat food has been cooled down to $t_0$.

In an alternative implementation, when the second control module controls the compartment to perform the heating operation, it is specifically configured to:

control the compartment to perform the heating operation according to a third target temperature $T_3$, and the third target temperature $T_3$ ranges from $-1°$ C. to $4°$ C.

In an alternative implementation, the compartment is one or more of the following:

a variable temperature chamber of the refrigerator or a variable temperature region isolated by the variable temperature chamber, a variable temperature drawer in a refrigerating compartment of the refrigerator or a variable temperature region isolated by the variable temperature drawer, and a variable temperature drawer in a freezing compartment of the refrigerator or a variable temperature region isolated by the variable temperature drawer.

In an alternative implementation, referring to FIG. 12, the controller further includes:

a reminding module 27 configured to send a reminder information to a user if it is judged that the storage time of the meat food in the compartment of the refrigerator exceeds the preset number of days.

The controller of the embodiments of the present disclosure can be used to perform the partial-freezing meat fresh-preservation control method described in the above embodiments, and the principle and technical effects thereof are similar and will not be described in detail herein.

Figure 13:
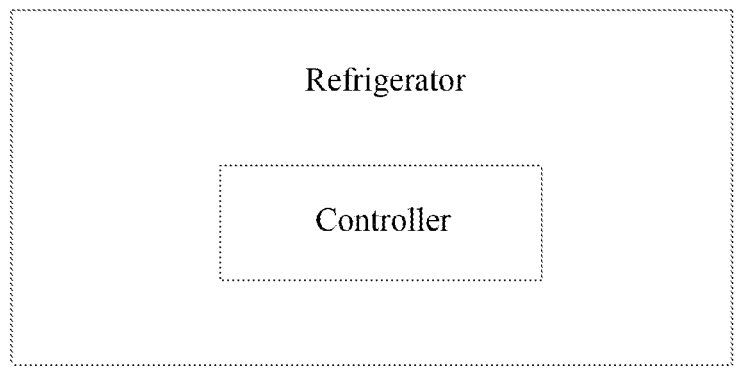
FIG. 13 is a schematic structural diagram of a refrigerator according to still another embodiment of the present disclosure.

Based on the same inventive concept, still another embodiment of the present disclosure provides a refrigerator, referring to FIG. 13, which includes the controller as described in the embodiments above.

Since the refrigerator provided by the embodiment of the present disclosure includes the controller of the above embodiment, it may maintain the meat food in a fresh and easy-to-cut state for a long time, and make up technical gap in the field.

The embodiments above are only used to explain the technical solutions of the present disclosure, and are not limited thereto; although the present disclosure is described in detail with reference to the foregoing embodiments, it should be understood by those skilled in the art that they can still modify the technical solutions described in the foregoing embodiments and make equivalent replacements to a part of the technical features; and these modifications and substitutions do not make the essence of the corresponding technical solutions depart from the spirit and scope of the technical solutions of the embodiments of the present disclosure.

The invention claimed is:

1. A refrigerator comprising a compartment configured to store a piece of meat; and a controller configured to:

acquire a first temperature of a piece of meat in the compartment;

determine whether the first temperature of the piece of meat is greater than or equal to a first temperature threshold, the first temperature threshold being a temperature value that keeps the piece of meat in a partially-frozen and easy-to-cut state;

control a cooling operation on the compartment in response to that the controller determines that the first temperature of the piece of meat is greater than or equal to the first temperature threshold;

determine whether the piece of meat is frozen during the cooling operation;

start a timing operation in response to that the controller determines that the piece of meat is frozen during the cooling operation; and control a heating operation on the compartment after the timing operation has lapsed a first preset time period, wherein the first preset time period has a duration of at least one hour and is chosen to maintain the piece of meat in the partially-frozen and easy-to-cut state, and to reduce a cooling-warming switching frequency.

2. The refrigerator of claim 1, wherein the controller is further configured to control a heating operation on the compartment in response to determining that the first temperature of the piece of meat is less than the first temperature threshold.

3. The refrigerator of claim 1, wherein the controller is further configured to control a cooling operation on the compartment in response to determining that the piece of meat has not been frozen during the cooling operation.

4. The refrigerator of claim 1, wherein the controller is further configured to:
- determine that the piece of meat is frozen during the cooling operation in response to the piece of meat has a valley temperature point during the cooling operation and a temperature elevation amount in a first preset continuous time period starting from the valley temperature point is greater than or equal to a preset temperature change amount; and;
- determine that the piece of meat is frozen during the cooling operation in response to that a temperature of the piece of meat remains unchanged during a second preset continuous time period during the cooling operation.

5. The refrigerator of claim 1, wherein the controller is further configured to acquire the first temperature of the piece of meat in the compartment of the refrigerator using a plurality of temperature sensors; and
- determine whether the piece of meat is frozen during the cooling operation using the plurality of temperature sensors and based on a first determination result of a temperature sensor of the plurality of temperature sensors indicating that the piece of meat has been frozen during the cooling operation.

6. The refrigerator of claim 1, wherein the controller is further configured to:
- control the cooling operation on the compartment according to an initial target temperature, the initial target temperature being in a range from about −10° C. to about −1° C.

7. The refrigerator of claim 1, wherein the controller is further configured to:
- control the cooling operation on the compartment according to a first target temperature, and continuously control the cooling operation on the compartment according to a second target temperature after the piece of meat has been cooled down to the first temperature threshold, the first target temperature being lower than the second target temperature.

8. The refrigerator of claim 1, wherein the controller is further configured to:
- control a damper of the compartment to be fully opened and perform the cooling operation according to an initial target temperature, and control the damper of the compartment to be half-opened and continuously perform the cooling operation according to the initial target temperature after a temperature of the piece of meat has been cooled down to the first temperature threshold.

9. The refrigerator of claim 1, wherein the controller is further configured to:
- control the heating operation on the compartment according to a third target temperature, the third target temperature being in a range from about −1° C. to about 4° C.

10. The refrigerator of claim 1, wherein the compartment is one or more of:
- a variable temperature chamber of the refrigerator or a variable temperature region isolated by the variable temperature chamber, a variable temperature drawer in a refrigerating compartment of the refrigerator or a variable temperature region isolated by the variable temperature drawer, and a variable temperature drawer in a freezing compartment of the refrigerator or a variable temperature region isolated by the variable temperature drawer.

11. The refrigerator of claim 1, wherein the controller is further configured to:
- send a reminder information to a user in response to that it is determined that a storage time of the piece of meat in the compartment of the refrigerator exceeds a preset number of days.

12. A controller configured to be arranged in a refrigerator, wherein the controller is further configured to:
- acquire a first temperature of a piece of meat in a compartment of the refrigerator;
- determine whether the first temperature of the piece of meat is greater than or equal to a first temperature threshold, the first temperature threshold being a temperature value that keeps the piece of meat in a partially-frozen and easy-to-cut state;
- control a cooling operation on the compartment in response to determining that the first temperature of the piece of meat is greater than or equal to the first temperature threshold;
- determine whether the piece of meat is frozen during the cooling operation;
- start a timing operation in response to that the controller determines that the piece of meat is frozen during the cooling operation; and
- control a heating operation on the compartment after the timing operation has lapsed a first preset time period, wherein the first preset time period has a duration of 2 to 6 hours and is chosen to maintain the piece of meat in the partially-frozen and easy-to-cut state, and to reduce a cooling-warming switching frequency.

* * * * *